Patented Jan. 14, 1941

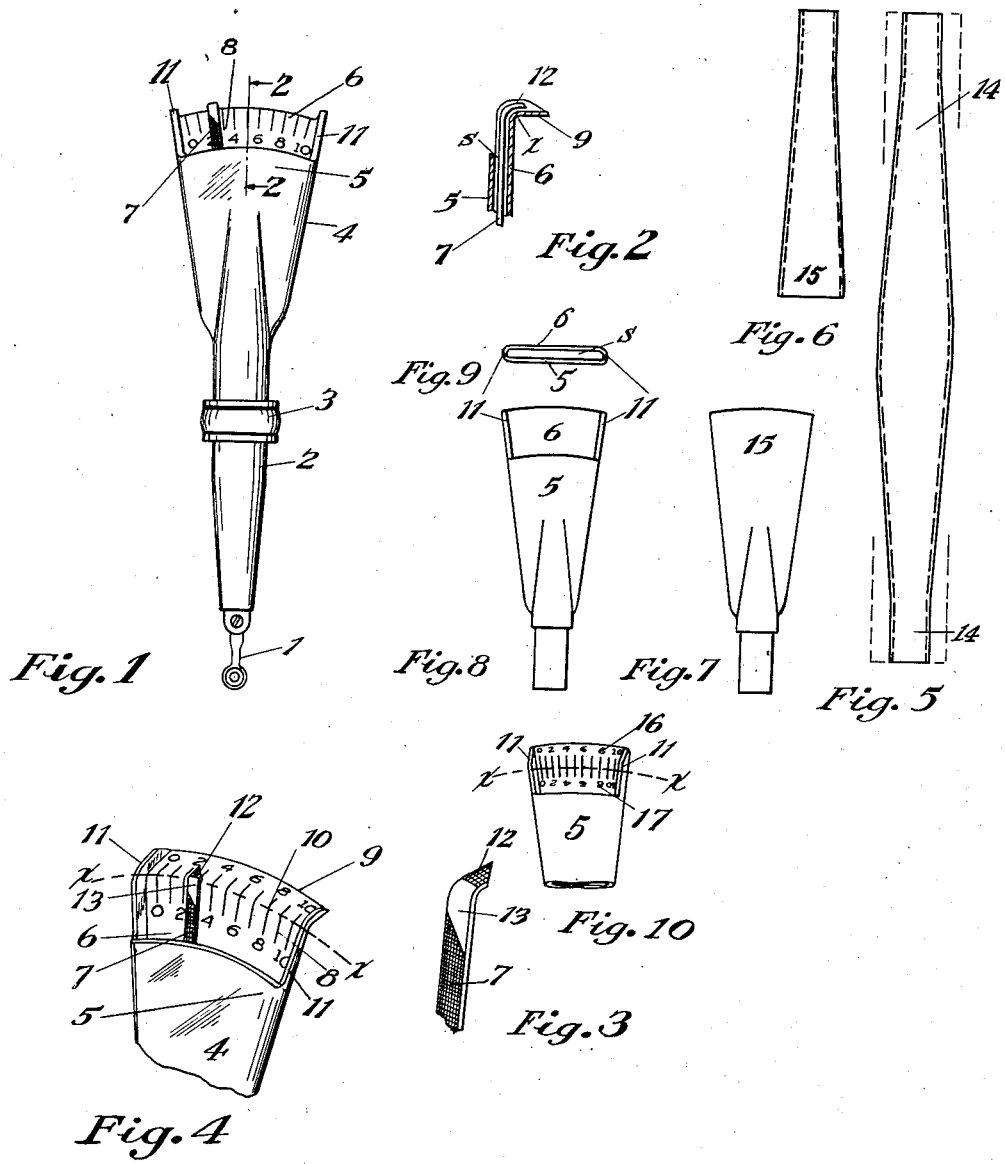

2,228,497

UNITED STATES PATENT OFFICE 2,228,497

INDICATING DEVICE FOR MEASURING INSTRUMENTS

Eugene J. Witchger, Saginaw, Mich., assignor to The Lufkin Rule Company, Saginaw, Mich., a corporation of Michigan Application January 3, 1939, Serial No. 249,040

1 Claim. (Cl. 33—172)

This invention relates to indicating devices such as are used on surface test indicators and similar measuring instruments having multiple scales.

The objects of my improvement are to provide a simplified housing comprising the indicating portion of such an instrument; to improve the facility of reading the instrument from different points of view; to provide a novel arrangement of angularly placed scales on the back wall of the housing; to provide from a single piece of metal a tubular housing having a vertical scale and a rearwardly projecting scale; to serve both scales by one pointer, the face of the pointer being arranged to appear like and to serve the purpose of two pointers, one indexing on the vertical scale, the other on the horizontal scale.

A further object is to provide from a single piece of metal such a housing having reinforcements at its side edges strengthening and stiffening the outwardly projecting horizontal scale flange, preventing its deformation in use, and also protecting the pointer.

Other objects are, to reduce the cost of manufacture of housings for surface test indicators and similar instruments employing dual scales substantially at right angles to each other; and to provide such a housing formed from a single tubular piece of sheet steel.

With the foregoing and certain other objects in view which will appear later in the specifications, my invention comprises the devices described and claimed and equivalents thereof.

Fig. 1 is a front view of a surface test indicator embodying my improvement;

Fig. 2 is a fragmentary sectional view taken on line 2—2 of Fig. 1;

Fig. 3 is a perspective view of the pointer showing its two indexing portions, one for each graduated scale, black colored portions being indicated by appropriate cross hatching;

Fig. 4 is a perspective view showing the upper end of the indicator;

Fig. 5 is a side view of a stock piece of seamless tubing, tapered at both ends, used for making two housings;

Fig. 6 is a side view of a tubular member from which a single housing may be made;

Fig. 7 shows the member illustrated in Fig. 6 after having been flattened at its larger end;

Fig. 8 shows the member, Fig. 7, part of its front wall having been cut away;

Fig. 9 is an end view of the member shown in Fig. 8; and

Fig. 10 shows the member, Fig. 8, after the projecting rear wall has been imprinted with scale graduations and numerals.

Referring to Fig. 1, numeral 1 designates the "feeler" or contact member of a surface test indicator. The part 2 contains the operating mechanism, of known construction. 3 designates a clamping bracket for supporting the instrument in working position.

My present improvement is particularly concerned with the upper part 4 of the housing. It is of flat tubular cross-section and in front view may be V-shaped, as shown in Figs. 1 and 4.

The front wall 5 of part 4 and the back wall 6 are integral, with a thin space S between them. The usual oscillatable pointer 7 projects up through the opening S, as shown in Figs. 1 and 2.

Back wall 6 projects upwardly beyond the upper edge of front wall 5 and on its front face exposes an upright scale, 8. Above scale 8 the top marginal edge of the back wall 6 has a rearwardly projecting arcuate flange 9 on which is a second graduated scale 10. Both scales 8 and 10 are traversed by the same pointer 7.

Preferably, the back wall 6 has flanges 11 along its side edges and the rearward flange 9 has similar flanges as shown in Fig. 4. These flanges 11 are reinforcements for the scale portions 8, 10 and serve as protections for the pointer 7, also giving a smooth and attractive finish to the side edges of both scale members.

The upright part of pointer 7 is adjacent the scale 8 and its tip 12 is bent rearwardly to provide an auxiliary pointer for scale 10, as in Fig. 4.

Referring now to Figs. 3 and 4, it will be seen that portions of pointer 7 adjacent the scales 8, 10 are of contrasting color to the part 13 between them which traverses the heel of the flange 9 along a line X—X.

This color contrast arrangement on the pointer itself gives the effect of two separate pointers, one for each scale, facilitating the reading of either scale from various points of observation.

The graduated scales 8, 10 behind the pointer may be colored like 13. Therefore, the intermediate part 13 of the pointer has no color contrast with its background and is not noticeable, but the portions adjacent the scales are contrastingly colored to stand out clearly. That is, the part 13 of the pointer contrasts with parts 7 and 12.

A new and useful method of making the housing 4 as an article of manufacture is as follows:

A piece of ductile tubing, preferably seamless, is cut to the required length for a housing, or, preferably for two housings, as indicated by the broken lines in Fig. 5. Each such stock tube has its ends drawn out to a reduced diameter, making the tube tapered at both ends 14, 14. The tube, if for two housings, is then cut into two lengths, providing two stock pieces, as in Fig. 6. The larger end 15 of such a piece is then flattened, Figs. 7 and 9, representing a thin space S between its front wall 5 and back wall 6 to accommodate pointer 7 in its swinging movement.

The upper end portion of the front wall 5 is then cut away so that the back wall 6 extends beyond the upper edge of the front wall 5. The side reinforcing flanges 11, 11 are left upstanding, as shown in Figs. 8 and 9, being prolongations of the edge walls of the housing.

On the thus exposed inner face of back wall 6 a scale with double length graduation lines is then inscribed or imprinted, as shown in Fig. 10, having at the top a row of numerals or indices 16 and at the bottom a similar row of numerals 17, thus in effect producing two scales in register. The top margin of the back wall 6 is then flanged rearwardly and outwardly along the arcuate transverse line X—X.

Two scales 8 and 10 are thus placed at an angle to each other having graduation lines in common.

The graduations of the two scales match exactly, that is, there can not be any reading differences between them, a defect frequently found in instruments where two scales, separately inscribed on separate pieces, have been assembled at an angle to each other by dovetailing or riveting.

The operator can place this device in any desired working position and by reason of the structure and arrangement of parts above described can take his readings from the front, above, or from any convenient angle, without errors or confusion of vision.

The housing structure is a new and useful article and the process by which it can be made from a single piece of material with no appreciable waste and with a minimum number of operations is also new and useful.

Having thus described my invention, what I claim and desire to secure by Letters Patent is:

A multiple scale device for a surface test indicator housing with a pointer operative therein, said housing having a back wall projecting upwardly beyond the upper edge of the front wall thereof, a graduated scale imprinted on the front face of such extended portion and visible from the front of the housing, the upper edge of said back wall being bent to present a rearwardly projecting arcuate flange bearing a second scale readable from above the housing; the said pointer having a straight portion extending across the face of said first scale and a portion bent at right angles thereto extending over said flange and overlying said second scale.

EUGENE J. WITCHGER.